June 27, 1939. G. R. WEISZ Re. 21,134
INKWELL BOTTLE
Original Filed May 15, 1935
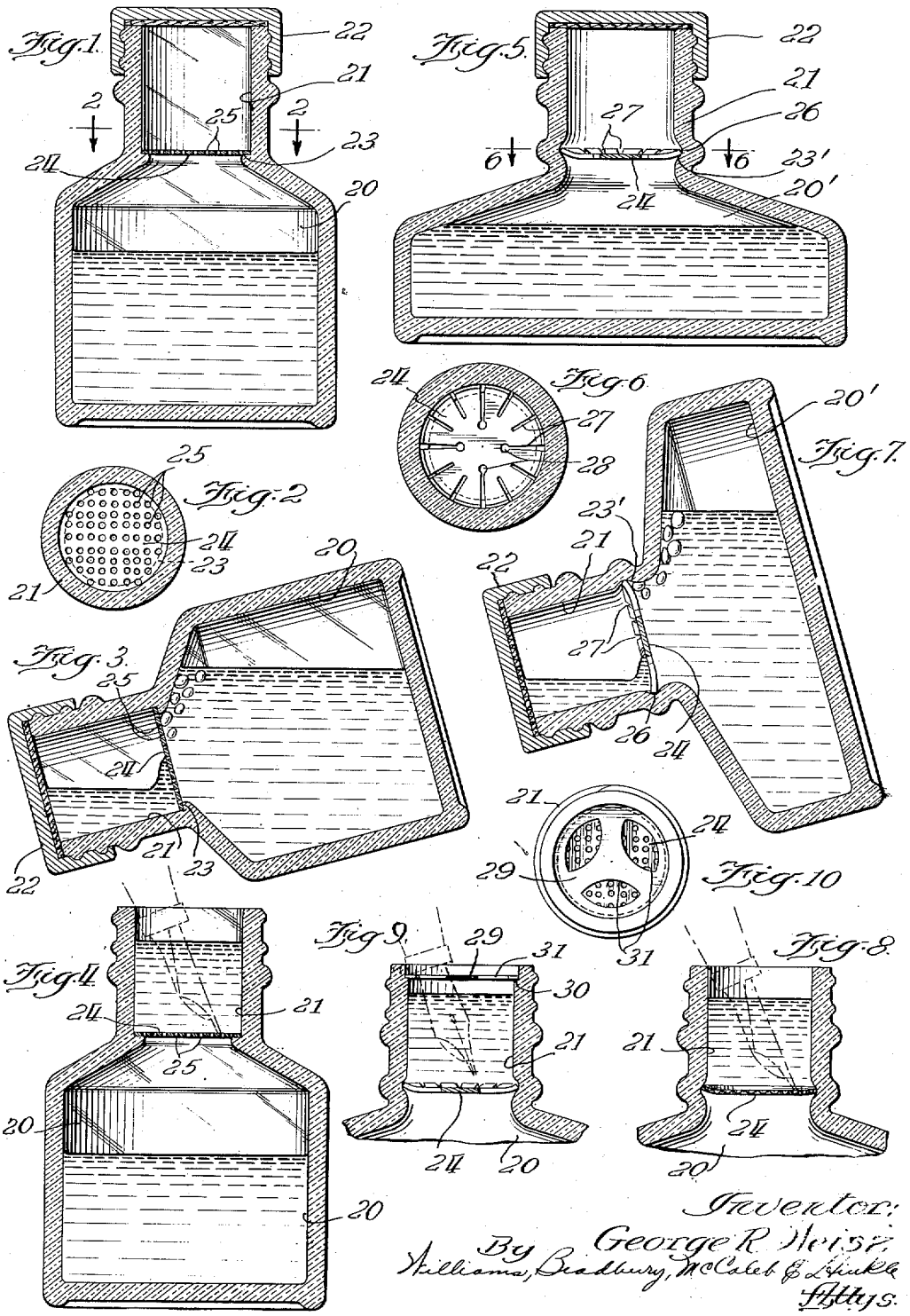
Inventor:
George R. Weisz,
By Williams, Bradbury, McCaleb & Hinkle
Attys.

Reissued June 27, 1939 Re. 21,134

UNITED STATES PATENT OFFICE 21,134

INKWELL BOTTLE

George R. Weisz, Chicago, Ill.

Original No. 2,061,262, dated November 17, 1936, Serial No. 21,668, May 15, 1935. Application for reissue November 17, 1938, Serial No. 241,062

18 Claims. (Cl. 120—69)

My invention relates to bottles, and especially to two compartment bottles in which liquid may be rapidly flowed from one compartment into the other and made to stay in either compartment, although the compartment be vertically superposed—without the use of valve mechanism. My invention is especially applicable to inkwell bottles, that is, bottles which serve as reservoirs for ink and in which ink may be packaged and sold, and which incorporate wells for filling fountain pens or dipping plain pens, in which a convenient minor quantity of ink may be segregated in convenient position.

Among the objects and advantages of my invention are:

(*a*) My filling well, in common with many previous wells embodied in ink bottles, retains the advantage of bringing a small body of ink conveniently near the mouth of the bottle into which the pen—either a fountain pen or an ordinary pen—can be dipped for convenient filling even though the supply of ink in the bottle is getting low. On the one hand it avoids an overdeep submersion of the pen point in the ink and, on the other hand, it avoids the likelihood of getting ink deposited on the barrel or handle of the pen by contact with the sides of the bottle neck.

(*b*) Once ink is transferred up to the filling well, it may be retained there more or less indefinitely against ordinary handling, whether the closure cap be on or off.

(*c*) The ink may be transferred to and from the filling well by a ready pouring action. This is an outstanding feature of my invention. In certain prior types of filling wells having superficial similarities to mine, there has not been this characteristic ready pouring action, but instead it has been necessary to shake the bottle to effect the transfer to or from the filling well. This shaking action is not only slower in operation and more awkward and inconvenient of performance, but it entails considerable danger of shaking ink out of the bottle if the operator has not remembered to tighten the closure cap. This ready pouring action which characterizes my invention, does not require a complete inversion of the bottle.

(*d*) In connection with the foregoing paragraphs (*b*) and (*c*), an object of my invention is to provide for the more or less indefinite or permanent retention of the ink in the filling well, coupled with the ready pouring of the ink from the reservoir to the filling well and from the filling well back to the reservoir—that is securing each of these features without the sacrifice of the other.

(*e*) Requirement of a lesser degree of tilting for effecting the transfer of ink. Depending somewhat upon the quantity of ink left in the bottle, the transfer may be readily effected by tilting the bottle only as far as would be necessary to pour ink from the bottle if it had no filling well. Thus, if the bottle is rather full, it need be tilted only through say 25 degrees, or if almost empty, through perhaps 135 degrees. Similarly, in returning the ink from the filling well to the reservoir or main portion of the bottle, at will, the bottle need be tilted through as little angle as 15 or 20 degrees.

(*f*) The only part which need be added to the ordinary neck of an ink bottle to convert it into a filling well may be a flat disc or plate of thin stock which can conveniently be stamped out to contour and to form the necessary perforations. This disc forms the bottom of the filling well while the neck of the bottle forms the side wall of the filling well. Previous filling wells which have required the addition of cup-shaped members to the bottle have been considerably more expensive to manufacture, not only because of the additional amount of material required but because, since expensive metals would be corroded by the ink, they have had to be molded from plastic materials.

(*g*) This disc or plate constitutes a screen which prevents the ingress of sizable particles of foreign matter into the reservoir portion of the bottle and keeps such particles up conveniently near the mouth of the bottle where they can easily be removed as, for example, by wiping out the surfaces of the filling well after the ink has been returned to the reservoir. Somewhat similarly, the disc acts as a screen to keep any sizable particles of ink sediment collected in the reservoir, from passing up into the filling well where they would get into the pen-point or filling passages and clog them.

(*h*) Another object of my invention is the provision of improved and peculiarly advantageous specific arrangement of diaphragm perforations.

(*i*) Because my filling well can be so constructed that the ink will readily flow back from the filling well to the reservoir upon a slight tilting of the bottle, an accidental tipping of the bottle through a few degrees before the operator catches the bottle to prevent its completely tipping over, will evacuate the filling well by backflow to the reservoir before the ink flows out over the mouth of the tilted bottle. The practical effect is a substantial elimination of the danger of spilling ink from an accidental partial tipping of the bottle.

(*j*) Because of the ready flowing of the ink from the filling well back to the reservoir, which characterizes my invention, the bottle may be refilled from a master supply bottle without any delay or inconvenience, even though the perforated diaphragm disc be left in place. This is because, with the bottle slightly tilted, the ink will flow from the filling well into the reservoir portion faster than one would ordinarily pour the ink out of the master supply bottle. However, the perforated diaphragm disc is readily removable to afford access to the walls of the entire bottle so that it may easily be washed and wiped clean before refilling.

(*k*) I have provided a novel form or shape for the reservoir portion of the bottle for facilitating the flow action through the diaphragm, as compared with a conventional shape of ink bottle.

(*l*) My ink well has the advantages of extreme simplicity of operation and structure. It embodies no moving parts and cannot get out of order. The only part which has to be added over the expense of the conventional ink bottle, is an inexpensive perforated diaphragm or disc. The incorporation of my filling well requires no departure from the design, dimensions and proportions of the conventional ink bottle. Within all practical limits it is applicable to any size of ink bottle.

(*m*) In general, I have provided a two compartment bottle separated by a diaphragm so constructed and arranged that, without the use of any moving valve parts, liquid may rapidly be flowed from one compartment to the other compartment through the diaphragm but where, when desired, the flow of liquid from one compartment to another may be stopped for indefinite periods of time.

The foregoing, together with further objects, features and advantages of my invention, are set forth in the following description of specific embodiments thereof, which are illustrated in the accompanying drawing wherein:

Fig. 1 is a vertical section through an ink bottle with a closure cap attached and with all of the ink in the reservoir portion of the bottle;

Fig. 2 is a plan section through the neck showing the diaphragm and taken on the line 2—2 of Fig. 1;

Fig. 3 is a transverse section similar to Fig. 1 but showing the bottle tilted and the ink in the process of flowing into the filling well;

Fig. 4 is a vertical section through the bottle with ink trapped in the filling well and with the cover removed and a pen inserted for filling;

Fig. 5 is a view similar to Fig. 1 but showing an improved shape of the reservoir portion of the bottle and illustrating a modified arrangement of diaphragm perforations;

Fig. 6 is a plan section through the neck of the bottle of Fig. 5 showing the modified diaphragm;

Fig. 7 is a view comparable with Fig. 3 but showing the bottle of Fig. 5;

Fig. 8 is a plan section through the neck of a bottle comparable with the upper portions of Figs. 1 and 5 but showing another modified form of diaphragm;

Fig. 9 is a fragmentary vertical section through the neck of a bottle, embodying my filling well, showing an auxiliary or upper diaphragm for limiting the penetration of the pen; and Fig. 10 is a plan view of the bottle neck and upper diaphragm of Fig. 9.

Referring to the form of Fig. 1, I have shown an ink bottle which, in external appearance, is of conventional form comprising a cylindrical body 20 which constitutes the reservoir of my bottle, and a neck 21 of reduced diameter, which constitutes a filling well. I prefer to employ a conventional screw cap 22, although I contemplate that a cork may be substituted, in which event the neck should be somewhat higher to compensate for the volume displaced by the cork within the neck whereby the available filling well volume will remain the same.

Internally of the bottle the bore of the neck is conformed to provide an annular shoulder 23, which may be of lesser diameter than the bore of the neck as shown in Fig. 1, or formed as a groove in the bore of the neck as shown in the later described Fig. 5. A perforated diaphragm 24 of circular shape to conform to the cross section of the bore of the neck is inserted through the neck and rests upon the supporting shoulder 23 at the bottom of the neck and defines the lower limits of the filling well. The diaphragm 24 is formed of sheet stock of preferably somewhat less than one-thirty-second of an inch thickness and of a material such as hard rubber or other composition which successfully withstands corrosion by the ink. The material is preferably slightly flexible. The diaphragm shown in Figs. 1 and 2 carries overall perforations in the form of holes 25 of a diameter between one-thirty-second and three-sixty-fourths inch. The diaphragm 24 preferably fits the bore of the neck at the shoulder 23 with sufficient friction to retain the diaphragm against accidental displacement, although the diaphragm can be pulled out for cleaning and for washing out the reservoir portion of the bottle.

Assuming the reservoir portion of the bottle has been filled as at the factory before( or after) the insertion of the diaphragm, to fill a pen from the bottle, the bottle is tilted through say 100 degrees with the closure cap 22 still in place. This inclined position of the diaphragm permits the ink to flow through the diaphragm from the reservoir into the filling well. When the filling well is full, or substantially full, of ink, the bottle is turned rather quickly to upright position before the ink can run back through the diaphragm. With the diaphragm in substantially horizontal position, as shown in Fig. 4, the cap is removed. The ink is trapped in the filling well and will remain in the filling well almost indefinitely, whether the cap be on or off. The filling well is of a convenient depth for the insertion of a penpoint or a fountain pen. The diameter of the filling well is such as will give ample volume for filling a fountain pen without bringing the level in the filling well down below the filling port of the fountain pen where the pen would start to suck in air.

To return the unused ink from the filling well to the bottle reservoir beneath, the bottle is tipped through some 30 degrees, whereupon the ink will rapidly run back through the diaphragm into the reservoir. This return may be effected while the cap is still off.

As I now understand the theory of operation of my inkwell bottle, it is as follows:

In pouring ink from the reservoir through the diaphragm to the filling well, the pressure due to the head of the liquid in the reservoir and the head of liquid being built up in the filling well will be unequal, there being less pressure at the upper perforations in the diaphragm than in the lower perforations. Ink will travel through the lower perforations while air will return through the upper perforations. If the level of ink in the reservoir covers the diaphragm entirely, the air being replaced by the inflow of ink to the filling well will bubble through the upper perforations of the diaphragm and escape into the reservoir above the ink level therein.

After the filling well has been completely or sufficiently filled and the bottle brought to upright position there will probably be some slight migrations of ink through the perforations whereby the air in the reservoir above the liquid level in the reservoir will apparently be slightly compressed by the reception of additional ink into the reservoir. This would establish a slight positive air pressure in the reservoir and this seems to be somewhat increased by similar additional flow of ink from the filling well to the reservoir when the fluid tight cap is removed.

In this position—with the cap removed and a body of ink in the filling well, with the diaphragm horizontally disposed—the air in the reservoir will be slightly above atmospheric pressure by an amount which, aided by the surface tension of the menisci across the perforations, will support the head of ink in the filling well. With this balance established, the bottle will withstand tilting up to say 10 degrees and a considerable amount of handling and jarring as might be incident to moving the bottle and filling a pen, all without causing the ink to run back into the reservoir.

In the design of the diaphragm, a limiting factor on the size of the apertures is the ability of the menisci to withstand collapse, the tendency to collapse being in proportion to the diameter of the apertures for their width, in the case of elongated or slot-like apertures. Below this limit and above an impracticably small pinhole a characteristic of ready flowing through the thin perforated diaphragm disc is not materially affected by the size of the perforations. In referring to the ready flow, I am distinguishing from an obstinate flow which requires more or less shaking. I am not speaking of the speed of flow. The speed of flow with a thin diaphragm disc is determined by the size and number of holes. Three or four very small perforations would result in a much slower flow than a score of large holes. But in either case there would be the characteristic ready flow.

The short length of the apertures or holes, which results from the relative thinness of the diaphragm disc, is of importance to the production of my characteristic ready flow. For a ready flow of the ink through the diaphragm disc, the perforations must not offer too great a resistance to flow to the capilarity of the menisci. In general, if the perforations are of some considerable length (the length, of course, here meaning the length measured in a normal to the plane of the disc, and generally being the thickness of the disc), the menisci forming in the apertures, with the ink in the filling well above the apertures and the air in the reservoir exposed to the bottom of the apertures, will, by their capillarity, present such resistance to flow that even though the bottle be tilted, the ink will not readily flow back into the reservoir. It can be moved back only by shaking the bottle so the inertia of the head of ink will pound the liquid columns down through the apertures in the course of the shaking. The thickness of my diaphragm discs, however, is in the order of the height of the capillary angle or cusps of the menisci. The entire height of the meniscus therefore cannot be contained within the height of the walls of the perforations as is the case when the disc is of considerable thickness. The result is that with the thin diaphragm disc, as soon as the balance which has maintained the ink in the filling well is materially disturbed as by tilting the bottle through 25 degrees or so, the menisci will readily collapse. This is because the menisci so readily reach the end of the side walls of the perforations, and with the greater diameter or width immediately available to the menisci, the curvature of the menisci flattens out and the resistance of its surface tension to flow of the liquid is immediately dissipated, permitting the ready collapse of the menisci.

The reason why the balance is materially disturbed when the bottle is tilted through some 25 degrees or so, is that the head of liquid on one lateral side of the disc is greatly increased while on the other side it is greatly decreased. The attendant ready collapsing of the menisci permits liquid to flow down on the high-head side and air to bubble up on the low-head side. Where the disc is of considerable thickness, however, the menisci cannot readily collapse and they offer considerable resistance both to the downflow of liquid and the bubbling up of air.

For these reasons, I secure my best results by using a thin diaphragm of a thickness less than, or even substantially the same as, the height of the cusp of the meniscus.

However, it will be seen, since the ready collapsing of the meniscus is favorably affected by both the thinness of the disc and the largeness of the holes, a disc of greater thickness can be employed with some degree of success if the apertures are large enough. But here there is the disadvantage of coming too close to the limiting factor on the maximum size of the holes where the menisci will no longer resist collapse while the ink is to be retained in the filling well. Whether the disc be of less thickness than the height of the cusp of the meniscus, or considerably thicker, to the extent that there is a ready flow in the absence of shaking, it is because the ratio between the size of the perforations and the length of the perforations is such that the menisci readily collapse.

Even when in effecting a transfer to or from the inkwell, the entire bottom or top face, as the case may be, is not entirely covered by the ink, there is the necessity for bubbling air through the exposed apertures. The wetting of the disc by the ink will leave a film or slug across the exposed aperture and this also will, if the meniscus does not readily collapse, impede the flow of the ink by preventing the flow of the air in the reverse direction.

If the bottle is made with a filling well of too small a diameter, the operation becomes unsatisfactory. The maximum distance between apertures has to be somewhat less than the diameter of the well. If this distance becomes smaller, the differential of pressure between even the most remote apertures, when the bottle is tilted, is too small to provide a satisfactory flow. Also, when the diameter of the filling well becomes too small, the capillarity of the meniscus across the well itself, increasing inversely as the diameter of the tube, becomes a serious factor in impeding the return of ink from the well, and also in impeding the flow of ink into the well if the neck, below the partition disc, is also of too small a diameter. In the inkwell illustrated in the drawing, the diameter of the filling well is about ⅞" and the diaphragm disc is about 3/32" thick.

In Fig. 5 I have illustrated a modified form of inkwell bottle. As compared with the form of Fig. 1 it is characterized chiefly by a different form of reservoir 20' of greater diameter but lesser height. The reservoir shown in Fig. 5 is calculated to have substantially the same capacity as that of Fig. 1. The advantage of this flattened horizontal type of reservoir, as used with my filling well and diaphragm, is that for any degree of fullness of the reservoir it enables the ink to flow more readily through the diaphragm in filling the filling well. I believe it requires, in general, a lesser degree of tilting to effect the transfer of ink to the filling well; and when the filling well is filled, the bottle of Fig. 5 permits a greater degree of accidental tipping, in general, because the ink in the reservoir is more apt to lap against the underside of the diaphragm and check the inadvertent return of the ink through the diaphragm to the reservoir.

In the form of Fig. 5 I have illustrated the diaphragm as retained by shoulder 23' which forms the under wall of an annular groove 26 formed in the bore of the neck. In Figs. 5 and 6 I have also illustrated a different arrangement of perforations than that shown in Figs. 1 and 2, although it will be understood that the perforation arrangement of Fig. 5 may be used in the bottle of Fig. 1, and the perforation arrangement of Fig. 1 may be used in the bottle of Fig. 5. The perforation arrangement of Fig. 5 comprises inwardly extending radial slots 27, some of which terminate in heads or round holes 28 in the center field of the diaphragm. One advantage in the use of elongated slots (as distinguished from round perforations of diameter equal to the width of the slots) is that once the meniscus is broken at one point in the slot, it will readily collapse down the entire length of the slot, whereas with a row of perforations a multiplicity of menisci will have to collapse successively. Another advantage of radial slots leading in from the outermost periphery of the disc, is that it permits the maximum distance between the lowermost perforation and the uppermost perforation when the diaphragm disc is in an inclined or vertical position. The farther apart vertically the uppermost and lowermost perforations are, the greater is the differential of pressure at the perforations for a given angular position of the diaphragm.

The use of the radial slots—or at least of one more or less radial slit—in the diaphragm is also of advantage in connection with annular seating groove 26, because it facilitates the ensmalling of the circumference of the diaphragm disc while inserting it through the smaller diameter of the neck and the subsequent snap-in action of the disc in seating itself in the groove 26.

Because a sealing fit of the diaphragm in the neck seat is not required, relatively large tolerances are permitted. Consequently my inkwell bottle lends itself to quantity production, since manufacturing inaccuracies in the size and trueness of the diaphragm and its seat in the neck may be allowed without impairing the operation.

I contemplate that the perforations may take forms other than the overall spaced holes of Fig. 2 or the headed or unheaded radial slots of Fig. 6. The perforations may be curved or S-shaped slots, or parallel slots, or any one of a wide variety of arrangements. In this connection in Fig. 8 I have illustrated a woven wire screen as constituting a modified form of diaphragm. From the standpoint of performance, a woven wire screen is very satisfactory because the width of the openings can easily be controlled by the mesh size of the screen and a very large proportion of the entire area of the diaphragm is open, which means a greater portage for the flow of the ink. The objection to the woven wire screen is that to be durable it is preferably made of metal and must be made of a relatively expensive metal or coated relatively expensively, in order to prevent corrosion or other attack by the ink.

There is an advantage in the use of elongated slots as exemplified by Fig. 6, as distinguished from the more or less round perforations exemplified by Fig. 2. With inks which tend to foam excessively upon being "worked," passing the ink through the multiplicity of small and isolated perforations, as in the diaphragm of Fig. 2, causes more foaming of the ink than where the openings take the form of relatively continuous slot-like openings, as in Fig. 6. Apparently the explanation for this phenomenon is that when the surface level of the ink travels from one perforation to another, there is a tendency for the formation of a bubble at each interruption, whereas in the elongated slots there are fewer interruptions. Another possible explanation is that bubbles formed by ink passing through the elongated slots tend to be larger and, therefore, more easily broken up, whereas with the multiplicity of small perforations there are more bubbles formed and they are small in size and hence do not so quickly disappear. The foaming of the ink would be objectionable because it would displace liquid ink in the well, it might tend to overflow the top, and it might cause the introduction of air into the sac of the pen.

Where the diaphragm is of hard rubber or suitable composition material in sheet form, the diaphragm may be stamped out very inexpensively and since once the molds are provided the bottles cost practically no more to include the diaphragm supporting shoulder, my filling well may be incorporated in an ink bottle at a very trifling additional cost of manufacture.

If desired, an upper disc 29, such as shown in Figs. 9 and 10, may be set into a shoulder 30 at the mouth of the neck. The upper disc 29 carries a plurality of openings 31, preferably roughly conformed to the sectional contour of a fountain penpoint so that the penpoint may be passed through the openings 31 and immersed in the ink in the filling well, the end of the pen handle or barrel resting upon the top surface of the disc 29 to prevent wetting the barrel or handle with ink.

As above indicated, it is important to the successful retention of a head of liquid above the diaphragm with air exposed to the lower side thereof, that in effect one of the chambers—the reservoir or the well—be sealed from outside atmosphere save by way of the diaphragm. That is because it is apparently necessary that the pressure of the air on the underside of the diaphragm be a little greater than the pressure of the air on top of the head of liquid which the diaphragm is to support. In the structure shown the reservoir is the chamber which is thus primarily sealed. In the position of Fig. 4 air in the reservoir and beneath the diaphragm is slightly above atmospheric pressure. If the bottle were turned upside down from the pouring position of Fig. 3 instead of being returned to the vertical position of Fig. 4, then, even though the cap did not seal, the liquid head would be supported in the reservoir by the diaphragm by creation of a slightly sub-atmospheric pressure in the reservoir above the level of the liquid therein. In either case the diaphragm would not hold the liquid thereabove if the air in both chambers were in free communication with atmosphere.

When, as shown, the wall of the neck or small chamber is of glass, the operator can observe the amount of liquid poured through the diaphragm from the reservoir into the upper chamber or well. If it is desired to trap less than a well full of liquid, the bottle can be turned to bring the diaphragm to a horizontal position when the desired amount of liquid has been poured through the diaphragm.

In referring to openings or perforations in or through the diaphragm, I intend to contemplate also the use of marginal slots in the diaphragm or marginal clearances between the diaphragm and neck.

This application constitutes a continuation in part of my application, Serial No. 727,939, filed May 28, 1934.

I claim:

1. An ink bottle comprising a vessel having a reservoir, an elevated filling well, and a horizontally disposed foraminous diaphragm separating said reservoir and well, said diaphragm having a relatively large open area divided into relatively small openings of such area that the menisci thereacross will support a substantially balanced head of ink in the well by the air trapped within the reservoir and also readily collapse to permit rapid flow of ink through the diaphragm in either direction under an unbalanced head of ink on the diaphragm when the bottle is tilted.

2. An ink bottle comprising a reservoir, an elevated filling well, and a horizontally disposed diaphragm between the well and reservoir having unvalved perforations therein, the width of the perforations and the length of the perforations relative to their width being such that the menisci across the perforations will permit air trapped therebelow to support the head of ink in the filling well and also collapse to permit ready pouring of the ink through the diaphragm perforations under a static head of the ink when the bottle is tilted.

3. An ink bottle comprising a reservoir, an elevated filling well, and a horizontally disposed diaphragm between the well and reservoir having unvalved perforations therein, the width of the perforations and the length of the perforations relative to their width being such that the menisci across the perforations will permit air trapped therebelow to support the head of ink in the filling well and also collapse to permit ready pouring of the ink through the diaphragm perforations under a static head of the ink when the bottle is tilted, the length of the apertures being less than the height of the cusps of the menisci.

4. An ink bottle comprising a reservoir, an elevated filling well, and a horizontally disposed diaphragm between the well and reservoir having unvalved perforations therein, the width of the perforations and the length of the perforations relative to their width being such that the menisci across the perforations will permit air trapped therebelow to support the head of ink in the filling well and also collapse to permit ready pouring of the ink through the diaphragm perforations under a static head of the ink when the bottle is tilted.

5. An ink bottle comprising a reservoir portion, a neck portion thereabove having an inside diameter in the order of 1¼'', an inward shoulder in the neck spaced below the mouth, and a perforated diaphragm disc extending across the neck and removably supported upon the shoulder, the disc and the neck thereabove constituting an elevated pen filling well, the disc being of a thickness in the order of $\frac{1}{32}$'' and the perforations being of a width sufficiently small to permit air trapped in the reservoir below the disc to support, through the menisci of the perforations, a head of liquid in the well of a depth sufficient for filling a fountain pen.

6. An inkwell bottle comprising an elevated filling well, a reservoir, a horizontally disposed diaphragm therebetween having slots extending inwardly from the periphery to the central field thereof, the diaphragm being of a thickness in the order of the height of the cusps of the meniscus of ink and the slots being of a width whereby the surface tension of the menisci across the slots is sufficient to support a body of liquid in the filling well with the air in the reservoir under slight positive pressure.

7. An inkwell bottle comprising an elevated filling well, a reservoir, a horizontally disposed diaphragm therebetween, the diaphragm being formed of woven wire screen with the openings between the wires of a width such that the surface tension of the menisci across the openings is sufficient to support a body of liquid in the filling well with the air in the reservoir under slight positive pressure.

8. An inkwell bottle comprising a reservoir portion and a neck-like portion therefor thereabove and constituting a filling well, a horizontally disposed diaphragm between the filling well and the reservoir portion having perforations therethrough of vertical length in the order of the height of the cusps of the ink menisci and of width such that the surface tension of the menisci across the perforations will support a head of ink in the filling well of height equal to the length of a standard penpoint, when aided by slight positive pressure of the air in the reservoir on the underside of the diaphragm, the height of the reservoir portion in proportion to its diameter being in the order of one to not less than two.

9. An inkwell bottle comprising a reservoir portion and a neck-like portion therefor thereabove and constituting a filling well, a horizontally disposed diaphragm between the filling well and the reservoir portion having perforations therethrough of vertical length in the order of the height of the cusps of the ink menisci and of width such that the surface tension of the menisci across the perforations will support a head of ink in the filling well of height equal to the length of a standard penpoint, when aided by slight positive pressure of the air in the reservoir on the underside of the diaphragm, the height of the reservoir portion in proportion to its diameter being in the order of one to not less than two and the top of the reservoir portion being of broadly conical form truncated by the diaphragm.

10. An ink bottle comprising a body portion constituting a reservoir, a vertically disposed tubular neck portion constituting a filling well above the reservoir, a horizontally disposed annular groove in the inner wall of the neck portion at the bottom of the filling well, a disc of resiliently flexible sheet material horizontally disposed across the neck with its periphery received in the groove for positioning and holding the disc, the disc constituting a diaphragm between the well and reservoir and having unvalved perforations therein, the width of the perforations and the length of the perforations relative to their width being such that the menisci across the perforations will permit air trapped therebelow to support the head of ink in the filling well and also collapse to permit ready pouring of the ink through the diaphragm perforations under the static head of the ink when the bottle is tilted.

11. An ink bottle comprising a body portion constituting a reservoir, a vertically disposed tubular neck portion constituting a filling well above the reservoir, a horizontally disposed annular groove in the inner wall of the neck portion at the bottom of the filling well, a disc of resiliently flexible sheet material horizontally disposed across the neck with its periphery received in the groove for positioning and holding the disc, the disc constituting a diaphragm between the well and reservoir and having unvalved perforations therein, the width of the perforations and the length of the perforations relative to their width being such that the menisci across the perforations will permit air trapped therebelow to support the head of ink in the filling well and also collapse to permit ready pouring of the ink through the diaphragm perforations under the static head of the ink when the bottle is tilted, some of the perforations being in the form of more or less radially arranged slots extending to the peripheral edge of the disc for ensmallment of the circumference of the disc when inserted through the neck down to the groove.

12. An ink bottle comprising a body portion constituting a reservoir, a vertically disposed tubular neck portion constituting a filling well above the reservoir, a horizontally disposed annular groove in the inner wall of the neck portion at the bottom of the filling well, a disc of resiliently flexible sheet material horizontally disposed across the neck with its periphery received in the groove for positioning and holding the disc, the disc constituting a diaphragm between the well and reservoir and having unvalved perforations therein, the width of the perforations and the length of the perforations relative to their width being such that the menisci across the perforations will permit air trapped therebelow to support the head of ink in the filling well and also collapse to permit ready pouring of the ink through the diaphragm perforations under the static head of the ink when the bottle is tilted, the disc having a slit extending inwardly from its peripheral edge to permit ensmallment of the circumference of the disc while passing through the neck above the groove.

13. An inkwell bottle comprising an elevated filling well, a reservoir, a horizontally disposed diaphragm separating the well and reservoir and having a field exposed thereto, the diaphragm having openings therethrough, the major portion of the aggregate area of the openings being constituted by elongated slots whose lengths are at least several times their widths—whereby the ink, in passing through the openings, passes for the most part through the elongated slots—the diaphragm being of a thickness in the order of the height of the cusps of the meniscus of the ink and the openings being of a width whereby the surface tension of the menisci across the openings is sufficient to support a body of liquid in the filling well when the air pressure in the reservoir is under slightly greater pressure than the air above the ink in the well.

14. A bottle comprising a vessel having a reservoir chamber, an elevated chamber, and a horizontally disposed foraminous diaphragm separating the chambers having openings therethrough of such cross section and length that the menisci across the openings will support a substantially balanced head of liquid above the diaphragm by air therebelow but, when the bottle is tilted to tilt the diaphragm out of horizontal and unbalance the head, will collapse to permit ready flow of liquid through the diaphragm.

15. A bottle comprising a lower chamber, an upper chamber, an unvalved horizontal diaphragm separating the chambers, and perforations through the diaphragm of such cross section and length relative thereto that the menisci of liquid across the perforations will permit air below the diaphragm to support a head of liquid above the diaphragm but will collapse to permit ready flow of the liquid through the diaphragm under a static head of the liquid when the bottle is tilted.

16. A bottle according to claim 15 wherein one of the chambers is sealed from atmosphere save by way of the diaphragm perforations.

17. A bottle according to claim 15 wherein the lower chamber is sealed from atmosphere save by way of the diaphragm perforations.

18. A bottle comprising a reservoir chamber, a relatively small chamber in superposed relation thereto, a horizontally disposed thin diaphragm separating the chambers, small openings through the diaphragm of width sufficiently small to permit air exposed to the underside of the diaphragm to support, through the liquid menisci across the openings, a head of liquid in one of the chambers and above the diaphragm but to permit ready flow of the liquid through the openings when the head of liquid is unbalanced by tilting the bottle, the reservoir chamber being sealed from atmosphere save by way of the diaphragm openings, and a portage for the small chamber adjacent the end thereof opposite the diaphragm.

GEORGE R. WEISZ.